Sept. 27, 1966 H. S. POLLER 3,274,879

SELF-LOCKING CLEVIS PIN

Filed Dec. 24, 1964 2 Sheets-Sheet 1

INVENTOR.
HARRY S. POLLER

BY Mallinckrodt and Mallinckrodt
ATTORNEYS

Sept. 27, 1966 H. S. POLLER 3,274,879

SELF-LOCKING CLEVIS PIN

Filed Dec. 24, 1964 2 Sheets-Sheet 2

INVENTOR.
HARRY S. POLLER

BY Mallinckrodt and Mallinckrodt
ATTORNEYS

United States Patent Office 3,274,879
Patented Sept. 27, 1966

3,274,879

SELF-LOCKING CLEVIS PIN

Harry S. Poller, Moab, Utah, assignor of sixty percent to Atlas Corporation, New York, N.Y., a corporation of Delaware Filed Dec. 24, 1964, Ser. No. 421,166
7 Claims. (Cl. 85—5)

Figure 1:
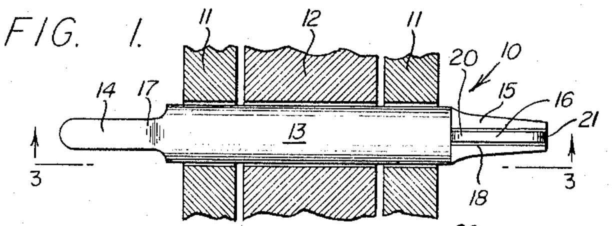

This invention relates to clevis pins adapted to be inserted through receiving holes in various members for coupling separate structures together or to provide anchorage, usually temporarily.

Clevis pins have been developed in the past that resist being withdrawn from their receiving holes, so as to insure against inadvertent release of the structures coupled together or anchored. An example of such a pin is shown in Tubs U.S. Patent No. 2,471,175.

So far as I am aware, however, none of these previously known clevis pins are constructed to be inserted through and removed from their receiving holes with a simultaneous twist-thrust motion, so as to be positively held against axial forces tending to dislodge them from such receiving holes.

It is a principal object of the present invention to provide a self-locking clevis pin that is adapted to be easily inserted through and removed from receiving holes with a twist-thrust motion so that it will be positively held therein against inadvertent dislodgement and yet be easily removed by one-hand manual manipulation, without damage to the pin or to the material marginal to and defining the hole.

Outstanding features of my invention are the provision of one or more flexible and resilient fins normally projecting laterally from a reduced portion of the shank of the clevis pin and the provision of a head for such pin that is easily gripped for both twisting and pushing or pulling of the clevis pin for easy insertion of the shank in and removal thereof from a receiving opening. The shank and the fin or fins are specially constructed to allow each fin to easily wrap around the reduced portion of the shank, without wrapping around the shank proper, which is of larger diameter, and, in one embodiment, the free terminus of the shank proper is specially configurated to serve as an alignment member for a plurality of holes in structural members to be coupled together.

There are shown in the accompanying drawings specific embodiments of the invention representing what are presently regarded as the best modes of carrying out the generic concepts in actual practice. From the detailed description of these presently preferred forms of the invention, other more specific objects and features will become apparent.

Figure 2:
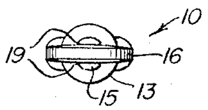
Figure 3:
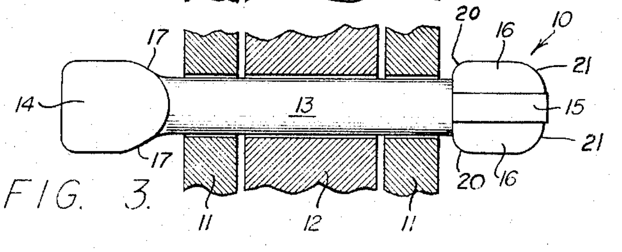
Figure 4:
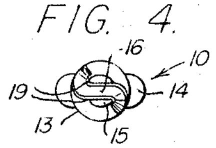
Figure 5:
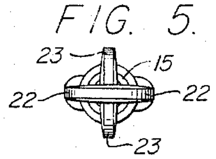
Figure 6:
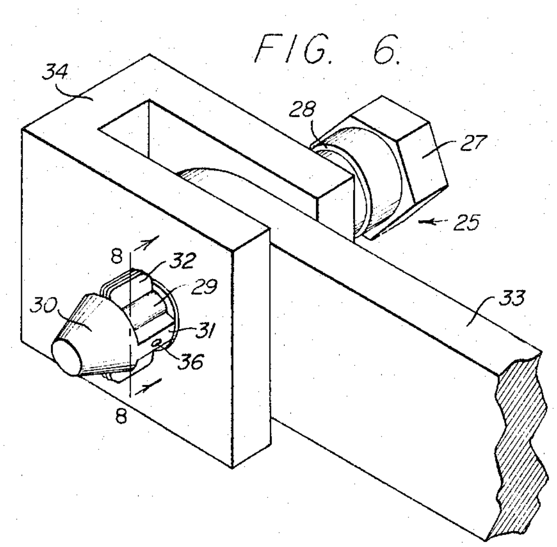
Figure 8:
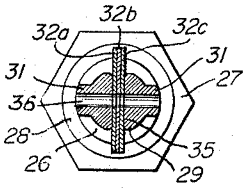
Figure 9:
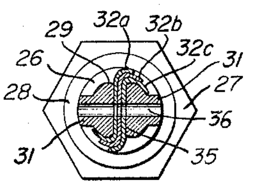
Figure 7:
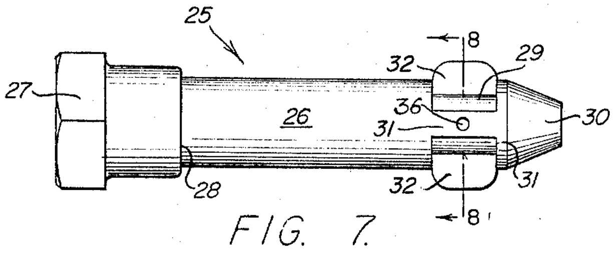
Figure 10:
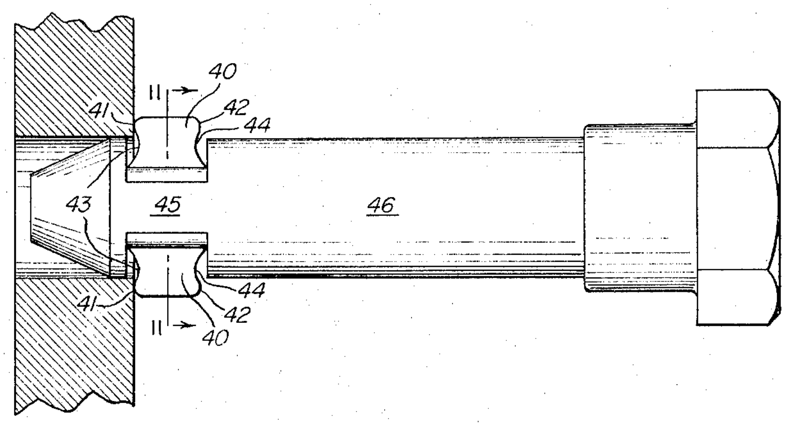
Figure 11:
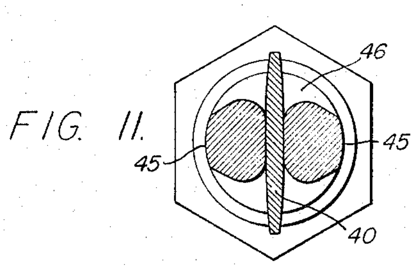

In the drawings:

FIG. 1 shows in elevation one form of celvis pin of the invention coupling together separate structural members, such as those shown in FIG. 6, the structural members being here shown in section, and wherein the pin has a pair of oppositely projecting fins;

FIG. 2 an end view looking toward the shank;

FIG. 3, a longitudinal section taken on the line 3—3 of FIG. 1;

FIG. 4, a view similar to that of FIG. 2, but showing the fins in the wrapped positions they assume as they are passed through the receiving holes in the structural members being coupled together;

FIG. 5, a view similar to that of FIG. 2, but showing a clevis pin equipped with two sets of paired fins;

FIG. 6, a perspective view showing another embodiment of the clevis pin of the invention in coupling position;

FIG. 7, a side elevation of the pin of FIG. 6 shown per se;

FIG. 8, a transverse section taken on the line 8—8 of FIG. 7;

FIG. 9, a similar view, but showing the pin as it appears while being passed through receiving holes;

FIG. 10, a view in side elevation of a similar type of pin provided with a pair of fins of somewhat different form, the pin being positioned for passage through a receiving hole in a member which is shown in section taken axially of the hole;

FIG. 11, a transverse section taken on the line 11—11 of FIG. 10; and

Figure 12:
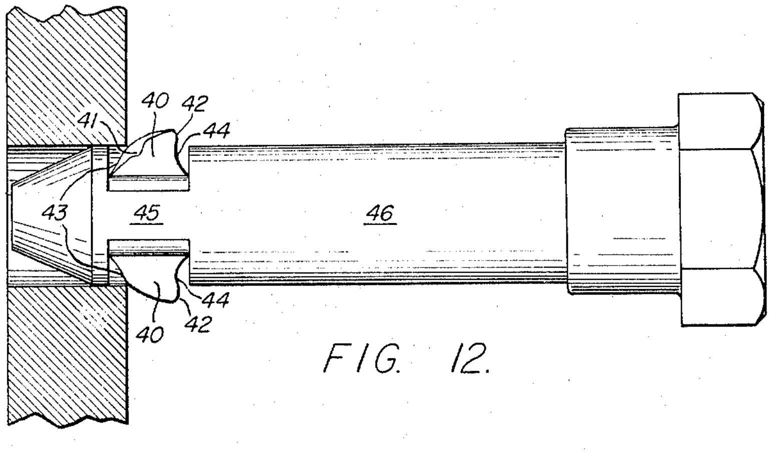

FIG. 12, a view similar to that of FIG. 10, but taken as the fins enter the receiving hole during combined twisting and pushing of the pin.

Referring now to the drawings:

In the embodiment illustrated in FIGS. 1–4, the clevis pin of the invention is shown generally at 10 interconnecting two independent structural members 11 and 12 that may be, for example, tongue and keeper coupling components of two railway ore cars. It is apparent that various other members can be similarly joined and that securely latched anchorage for various items, as well as a shaft for a sheave block, may be provided by a clevis pin of this invention in a generally similar manner.

The clevis pin 10 comprises a shank 13 of sufficient length to extend through the coupled members, a longitudinally flattened head 14 at one end of the shank, and a reduced shank portion 15 at the other end of the shank, together with a pair of fins 16 projecting laterally from opposite sides of the shank portion 15.

Head 14 includes tapered shoulder portions 17 that serve as stops and keep the head projecting for easy grasping. To this end, such head is made large enough to be easily gripped and manipulated for the application, simultaneously, of rotary and axial thrust forces to the pin.

Reduced shank portion 15 is of sufficiently smaller diameter than shank 13 that, when fins 16 are wrapped around it during the passage of the pin through a receiving hole or holes, the total circumference is, at most, no greater than the diameter of the shank proper 13. Thus, when the fins are closely wrapped around the reduced shank portion in which they are secured, the clevis pin can be easily pushed into working position in the receiving hole or holes and can as easily be pulled or driven therefrom.

Fins 16 are preferably flat and are made from stiff but flexible and somewhat resilient material, such as reinforced rubber, glass fiber and fluorocarbon plastic, layered nylon and neoprene, etc., and, as illustrated in FIGS. 1–5, are preferably formed integrally from one piece of material, which will ordinarily be cut from a sheet of the same. Thermo plastics containing molybdenum disulfide have been found excellent for the purpose, because of their durability strength, and lubricity. Flexible and resilient sheet metal, such as leaf spring steel, is also a satisfactory material in some instances, especially where a multi layered construction is desired for the fins, as will be further explained with reference to FIGS. 6–9.

The fins are preferably provided by inserting the piece of material through an elongated slot 18, formed through and axially of the reduced shank portion 15, with opposite ends of the piece projecting outwardly from the slot. Thus, the fins so formed lie in a common plane which is aligned with the longitudinal axis of the pin. The lengths of the projecting fins are limited, so they do not overlap when curled, by the twisting of the pin, to the insert position illustrated in FIG. 4. The central positioning of the fins allows them to wrap equally well around the reduced shank portion, regardless of the direction of rotation of the pin.

Edges 19 of slot 18 are advantageously rounded to allow the fins to more easily wrap around the reduced shank portion 15 in response to a minimum application of combined rotational and axial forces. Proper wrapping or curling of the fins is further insured by providing an arcuately curved corner configuration for the shoulders 20 and 21 of such fins. As illustrated, these shoulders are curved into the shank of the pin at their corners such that, as the pin is thrust into or withdrawn from a receiving hole, the fins engage the periphery of the hole along only a minimum area, preferably line rather than plane contact, and, as the pin is turned, such fins are wrapped or curled around and within the reduced shank portion by reason of friction at the contacts. Because of their curved configuration, such shoulders do not obstruct unduly as the pin is slid into and through the hole or holes.

It has been found that, if the fins are rectangular in configuration, the application of force along the axis of the pin causes their corners to deform and overlap the shank proper marginal to reduced shank portion 15, thereby causing the pin to bind as the fins are forced through the receiving hole or holes. Moreover, if the shoulders are angularly bevelled, enough to avoid binding in this manner, rather than being curved, the pin does not adequately resist pushing or pulling through the hole to give proper latching protection against inadvertent displacement.

In general, the fins extend substantially normal to the axis of the hole or holes through which they are to be passed and serve to effectively latch the pin against more than limited longitudinal movement within such receiving hole or holes. However, once rotational and axial forces are applied simultaneously, to the head 14 of the pin, frictional engagement of the fin shoulders 20 with the defining margins of the immediately adjacent hole, will cause the fins to wrap or curl around the reduced portion 15 of the shank 13, as previously explained. The curved shoulders then present a rapidly decreasing resistance to movement of the pin until the fins are completely wrapped or curled around the shank, within the reduced portion thereof, and are held in such positions by the defining walls of the hole or holes. By providing shoulders 20 with a smaller radius of curvature than the radius of shoulders 21, it becomes more difficult to remove than to insert the pin, which is desirable for latching security. However, in instances where a pin is to be removed frequently, the shorter radius of curvature is not desirable and would not normally be used, since the shoulders of the fins are more apt to be cut and damaged by defining edges of receiving holes.

A plurality of sets of fins can be provided on the clevis pin if desired. Such an arrangement, in tandem, is illustrated in FIG. 5, it being realized, of course, that the shank portion of reduced diameter is sufficiently long to accommodate both sets of fins 22 and 23.

FIGS. 6–9 show another form of the clevis pin of the invention. In this embodiment the pin (shown generally at 25) comprises a shank 26 and a hexagonal head 27, the latter including an elongate cylindrical extension 28 constituting a stop member. In addition to the necessary reduced shank portion 29, there is provided a tapered nose-piece 30 forming the free terminus of the shank. A pair of webs 31 interconnect the head portion of the shank proper with the opposite nose portion and radiate outwardly from the reduced shank portion to form unbroken continuations of the shank proper. Thus, as the pin is inserted through a plurality of more or less aligned holes in cooperating structural members, such as are shown in FIG. 6, the divergent nose-piece 30 forces the holes into exact alignment and the webs 31 hold them in alignment as the fins 32 are passed therethrough. This prevents possible damage to the fins.

It will be noted that cylindrical head portion 28 holds the hexagonal head 27 spaced from the members 33 and 34 through which the pin is passed and provides for more convenient gripping and manipulation of the pin.

In this instance, several leaf springs 32*a*, *b*, and *c* of spring steel provide the pair of oppositely-extending fins 32. They extend through a central elongate slot 35 in reduced shank portion 29. A retainer pin 36 extends through such reduced portion in a direction normal to the plane of the fins pieces, to hold them securely in position, with the plane of such fin pieces passing through the central elongate axis of the clevis pin.

As in the embodiment of FIGS. 1–5, the fins are formed with curved corners that prevent the pin being pulled or pushed through a hole, unless twisted at the same time, but that also, when the pin is so twisted, cause the fins to wrap or curl around the reduced portion 29 of shank 26, without overlap onto the shank proper where they would cause the clevis pin to bind. When both rotational and thrust forces are applied to the pin simultaneously, the fins wrap around the reduced portion of the shank, with the several layers sliding over one another to the position of FIG. 9. This layered construction provides maximum resistance to pulling or pushing, but only minimum forces are required to cause the several layers to wrap around the reduced shank portion, since each layer curls separately.

Another form of fins is shown in FIGS. 10–12, where they are designated 40, respectively. In this embodiment, such fins have rounded corners 41 and 42, as in the embodiment of FIGS. 1–7, but are provided with reverse curves 43 and 44 intermediate their heights. These reverse curves allow the shoulders to engage the margins of the receiving hole to resist withdrawal, without any portion of the edges of the fins being in engagement with the sharp edge surrounding the hole. Thus, a sharp edge at the periphery of a hole cannot cut the fins to reduce their useful life. When simultaneous rotational and thrust forces are applied to such a pin 46, the fins fold to the position shown in FIG. 12 and only the flat sides of the fins are diagonally scraped by a sharp edge of the hole.

Whereas there is here illustrated and specifically described certain preferred constructions of apparatus which are presently regarded as the best modes of carrying out the invention, it should be understood that various changes may be made and other constructions adopted without departing from the inventive subject matter particularly pointed out and claimed herebelow.

I claim:

1. A self-locking clevis pin, comprising
a shank having a portion of reduced diameter adjacent one end thereof,
an enlarged head at the opposite end of said shank for retaining said pin in a receiving hole in structure separate from the pin, said head being configurated for convenient grasping and pushing or pulling and turning simultaneously so the pin can be inserted in or extracted from the receiving hole; and a pair of stiffly flexible, resilient and non-retractable fins projecting oppositely from the reduced portion of said shank laterally of said reduced portion but within the length threof, the material of said fins being adapted to flex laterally of the fins and to wrap around the pin and said fins extending outwardly from the pin a distance adapted to securely latch the pin in the receiving hole without overlapping or exceeding in diameter the unreduced portion of the shank when wrapped around the reduced portion thereof during insertion and extraction of the pin in and from the receiving hole, the corners of each fin being curved as shoulders to insure effective resistance to axial forces but substantially minimum resistance to rotational and axial forces applied simultaneously to said pin, and the edges of the fins extending transversely to the shank being formed with reverse curves thereon, said reverse curves beginning adjacent to the shank and joining the curves of the corners.

2. A self-locking clevis pin according to claim 1, wherein the fin shoulders most remote from the head have a larger radius of curvature than do the shoulders more adjacent to the head.

3. A self-locking clevis pin according to claim 1, wherein an elongate slot is formed through the reduced portion of the shank, and the fins are formed by at least one leaf of stiffly flexible resilient material extending through and projecting from said slot at opposite sides of the shank.

4. A self-locking clevis pin according to claim 3, wherein the defining edges of the slot are rounded, whereby the fins are more easily wrapped around the reduced portion of the shank.

5. A self-locking clevis pin according to claim 3, wherein there are a plurality of leaves disposed in face-to-face relationship.

6. A self-locking clevis pin according to claim 1, further including a nose-piece at the free terminus of the shank opposite the head, said nose-piece being tapered from the shank to an end of reduced diameter.

7. A self-locking clevis pin according to claim 6, including webs radiating outwardly from the reduced portion of the shank and forming with the shank and nose-piece a continuous smooth surface of uniform diameter.

References Cited by the Examiner

UNITED STATES PATENTS

| | | | |
|---|---|---|---|
| 865,610 | 9/1907 | Pullets. | |
| 1,370,319 | 3/1921 | Kennedy. | |
| 2,696,138 | 12/1954 | Olschwang | 85—9 |
| 3,091,271 | 5/1963 | Samiran | 151—25 |
| 3,177,540 | 4/1965 | Hall et al. | 85—5 |

CARL W. TOMLIN, *Primary Examiner.*

EDWARD C. ALLEN, *Examiner.*

R. S. BRITTS, *Assistant Examiner.*